United States Patent [19]

Roberts et al.

[11] Patent Number: 5,272,829

[45] Date of Patent: Dec. 28, 1993

[54] FISH ATTRACTING BASSIN STUMP AND METHOD OF USE

[76] Inventors: Timothy J. Roberts, P.O. Box 128, Hardy, Va. 24101; Emmett W. Schulyer, 825 Wyndham Dr., Viton, Va. 24179

[21] Appl. No.: 17,154

[22] Filed: Feb. 12, 1993

[51] Int. Cl.$^5$ ............................................. A01K 91/00
[52] U.S. Cl. ............................................. 43/4; 43/44.99; 119/51.04; 119/61
[58] Field of Search ............... 43/4, 1, 4.5, 44.99, 43/55; 119/51.04, 51.01, 61, 57.9, 52.3, 52.1, 3

[56] References Cited

U.S. PATENT DOCUMENTS

| | | | |
|---|---|---|---|
| 777,382 | 12/1904 | Le Beau | 43/55 |
| 3,023,533 | 3/1962 | Bertram | 43/44.99 |
| 3,498,268 | 3/1970 | Sleith et al. | 119/61 |
| 3,561,402 | 2/1971 | Ishida . | |
| 3,653,362 | 4/1972 | Davis | 119/61 |
| 3,933,124 | 1/1976 | Ledoux et al. . | |
| 4,147,130 | 4/1979 | Goguel . | |
| 4,196,694 | 4/1980 | Buchanan . | |
| 4,212,268 | 7/1980 | Chapman . | |
| 4,316,431 | 2/1982 | Kimura . | |
| 4,334,499 | 6/1982 | Baass . | |
| 4,441,453 | 4/1984 | McMickle et al. . | |
| 4,578,888 | 4/1986 | Gomez . | |
| 4,727,672 | 3/1988 | Hill et al. . | |
| 4,736,708 | 4/1988 | Yoder | 119/3 |
| 4,819,369 | 4/1989 | Bodker | 43/102 |
| 4,913,094 | 4/1990 | Jones et al. . | |
| 4,916,845 | 4/1990 | Aydelette, Sr. . | |
| 4,947,791 | 8/1991 | Laier et al. . | |
| 4,993,362 | 2/1991 | Jimbo . | |
| 5,018,480 | 5/1991 | Goldman et al. | 119/26 |

*Primary Examiner*—Richard K. Seidel
*Assistant Examiner*—Chuck Y. Mah
*Attorney, Agent, or Firm*—Morgan & Finnegan

[57] ABSTRACT

A fish attracting device which simulates a tree stump to provide a habitat for fish to congregate. The device includes an outer textured wall that resembles the bark on a tree trunk and an inner chamber secured to the outer textured wall. A structure for deploying the device within a body of water is secured to the inner chamber.

21 Claims, 3 Drawing Sheets

FISH ATTRACTING BASSIN STUMP AND METHOD OF USE

BACKGROUND OF THE INVENTION

The present invention relates to structure fishing, and in particular to a fish attracting device suitable for use in structure fishing wherein the device can be submerged in bodies of fresh water or sea water. The fish attracting device according to the invention, once submerged in a fresh water body, attracts fish, e.g., bass, in bountiful quantities and provides a habitat for them.

Fish attracting devices for fresh water environments are known in the art. For example, U.S. Pat. No. 4,916,845 to Aydelette, Sr. describes a fish attracting device that includes a plurality of spaced apart disks located on a shaft 28. The shaft includes an anchor at the bottom for maintaining the device on the floor of the river or lake. The anchor includes a perforated container for a weighting material and bait. A buoy is connected to the upper end of shaft 28 to locate the fish attracting device.

U.S. Pat. No. 4,727,672 to Hill et al. includes a stem member 44 and dependent leaf like structures 64. While each of these devices may offer some shelter from above, e.g., the fish may hide under the disks or leaves, there is no lateral shelter because the supporting shaft or stem in extremely narrow. In addition, these device are expensive to manufacture.

In addition to the above fish attracting devices, there are numerous teachings in the art of artificial habitats, including artificial reefs. U.S. Pat. Nos. 3,933,124 (Ledoux, st al.), 4,212,268 (Chapman), 4,441,453 (McKickle et al), and 4,860,690 (De Santo et al) exemplify such structures. Ledoux, et al. create an artificial habitat by depositing helicoidal elements on the floor of the sea or fresh water body. Chapman discloses a totally artificial environment for small crustaceans. McMickle et al. disclose a plurality of devices having individual strands of a buoyant material attached to an anchor. The devices are deposited on the bed of the water body to form a habitat. De Santo et al. teach a marina dock and habitat dock located below a dock structure.

Artificial reefs for fish are also known. U.S. Pat. No. 4,334,499 to Baass uses a tire filled with concrete to form the artificial reef. U.S. Pat. Nos. 3,561,694 (Ishida), 4,316,431 (Kimura), 4,913,094 (Jones et al), 4,947,791 (Laier et al) and 4,993,362 (Jimbo) exemplify other artificial habitats. Some of these devices require exact placement of the habitat on the bed or floor of the water body. This necessitates the use of a diver who must enter the water and physically construct the habitat. This is time consuming and expensive.

The fish attracting device of the instant invention is lightweight, can be easily placed at a desired location and avoids the disadvantages of the fish attracting and habitat devices of the prior art.

SUMMARY OF THE INVENTION

The instant invention provides a fish attracting device that simulates a natural environment. In particular, the fish attracting device, e.g., the BASSIN STUMP, is shaped with the exterior appearance of a tree stump. The fish attracting device provides a habitat for the fish to congregate and hide.

The fish attracting device of the invention can be formed from a single piece of plastic, by molding or any other technique known to those skilled in the art, or from a plurality of connectable sections. The fish attracting device is sized to provide a habitat for fish, e.g. bass, and may be a few feet in diameter or larger, e.g., 5, 10, or 15 feet in diameter. The device includes an outer trunk-shaped wall having a textured outer surface that may resemble the texture of tree bark. Other textured surfaces are also possible.

The outer trunk-shaped wall has an upper end and a lower end. The outer wall is inclined, or slanted away, from a major longitudinal axis of the device to form a base having a larger dimension than the top. The trunk-shaped outer wall, in its preferred design, flares downwardly and outwardly away from the longitudinal axis of the fish attracting device and terminates at an edge that may be scalloped in shape.

The upper end of the trunk-shaped wall is connected to a tapered inner, downwardly extending chamber by an annular wall. The annular wall preferably contains openings for passing fluid, e.g., water, air, therethrough when the device is placed in the body of water. Alternatively, the openings may be located in the trunk-shaped wall, at the upper end thereof. The annular wall is preferably planar, but may be any shape that facilitates its manufacture. The number and size of the openings is sufficient to allow the device to sink to the floor of the water body.

The tapered inner, downwardly extended chamber has an outer wall that extends downwardly and is slanted or inclined inwardly toward the major longitudinal axis of the device so that the cross-sectional area of the upper end of the chamber is larger than the lower end of the chamber. The wall is in the shape of a tube having a circular, rectangular, or irregular cross-section. The only requirement is that the outer wall of the tapered inner chamber be sufficiently tapered so that many fish attracting devices according to the invention can be stacked in a nesting relationship. The openings that are preferably located in the annular wall, could also be located in the outer wall of the inner chamber at the upper end. The openings could also be in more than one wall, e.g. the trunk-shaped wall and the annular wall.

The lower end of the chamber wall is connected to an upwardly directed, substantially centrally positioned, hollow member by an annular member or wall. This hollow member includes an outer wall that is slanted or inclined inwardly towards the major longitudinal axis of the fish attracting device whereby the member tapers upwardly so that the upper end has a smaller cross-section than the lower end. The substantially centrally disposed member is of any cross-section, such as circular, elliptical, pyramidal, etc. The substantially centrally positioned member is closed at the upper end by a cap or wall. The cap includes at least one opening for the passage of a fluid, water or air therethrough. A ring or like structure is also located on the cap whereby a rope, chain, or similar device can be attached to the fish attracting device for positioning on the bed of the lake, river, ocean, etc. The ring is fixed in an upright position. Alternatively, the ring can be pivotally connected, e.g., hinged. Additionally, the ring facilitates the removal of the fish attracting device. The uppermost end of the substantially centrally positioned member, including the ring, terminates below the upper edge of the outer trunk-shaped wall.

The fish attracting device according to the invention is lightweight in design. This is because the tapered inner chamber and upwardly extending central member are essentially hollow in design and the base formed by the trunk-shaped wall is either substantially or completely open. A substantially open base is one that does not substantially impede the flow of water upwardly through the base of the fish attracting device. Thus, the inner surface of the trunk-shaped wall cooperates with the outer surface of the inner chamber to form an essentially open, upwardly extending chamber that communicates with the open/ hollow chamber of the central member.

The device can also include a material that will maintain the device in a submerged state. For example, rock, pebbles, gravel, lead weights, or sinkers can be used as a weighting material. Preferably, the weighting material is environmentally safe and will not float in water. The weighting material is located within the inner downwardly depending chamber, and is maintained in position by a removable cover. The cover includes threads, or similar interlocking features, that cooperate with corresponding structure on the outer surface of the substantially central member, at the upper end thereof, or on an inner surface of the outer wall of the downwardly extending chamber. In its preferred embodiment the annular cover includes internally located threads that cooperate with respective threads on an upper end of the cone-shaped central member.

Alternatively, the weighting material can be designed to be located within or connected to the trunk-shaped wall, e.g. the bottom edge of the outer trunk-shaped wall so that it is not necessary to add additional material to the device.

The inner upwardly extending, substantially central member is hollow and terminates below the upper end of the outer trunk-shaped wall. This allows a plurality of fish attracting units to be stacked in a nesting arrangement. As a result, more than one device can be loaded into a boat prior to their placement at a desired or selected location.

The device may be formed so that the outer textured wall, the first annular wall, the outer slanted wall of said inner downwardly extending chamber, the second annular wall and the wall forming the central member are integral with one another. In other words, the fish attracting device can be a unitary, one piece unit.

Alternatively, the fish attracting device of the instant invention can be formed from a plurality of sections. The respective sections will mate with one another and include flanges, tabs, or similar structure that will permit the sections to be fastened together. The fastening elements may be located on either the inner or outer surface of the outer trunk-shaped wall. The sections may be fastened by threaded nuts and bolts or equivalent fasteners known in the art. The tabs or flanges may extend inwardly towards the major longitudinal axis, or outwardly therefrom and could be provided with features that allow the sections to be snapped together. The device could be formed from split halves or quarter sections. The multiple section concept allows the device to be stored easily.

The instant invention can be used for structure fishing, or any fishing that can be improved by providing a habitat for fish. The first step is selecting an appropriate location in a stream or lake for the placement of the instant fish attracting device. After the selection is made, the device is transported to the selected location. If the device is fromed from several sections, the device is assembled. At that point, if gravel is to be used as the weighting material, the gravel is poured into the inner, downwardly extending chamber and the cover inserted into place so that the gravel cannot be spilled or dislodged. The device, or devices, are then lowered into position. The location of the fish attracting device is recorded by techniques well known to the skilled practitioner so that the location can be returned to at a later time.

DETAILED DESCRIPTION OF THE INVENTION

Figure 1:
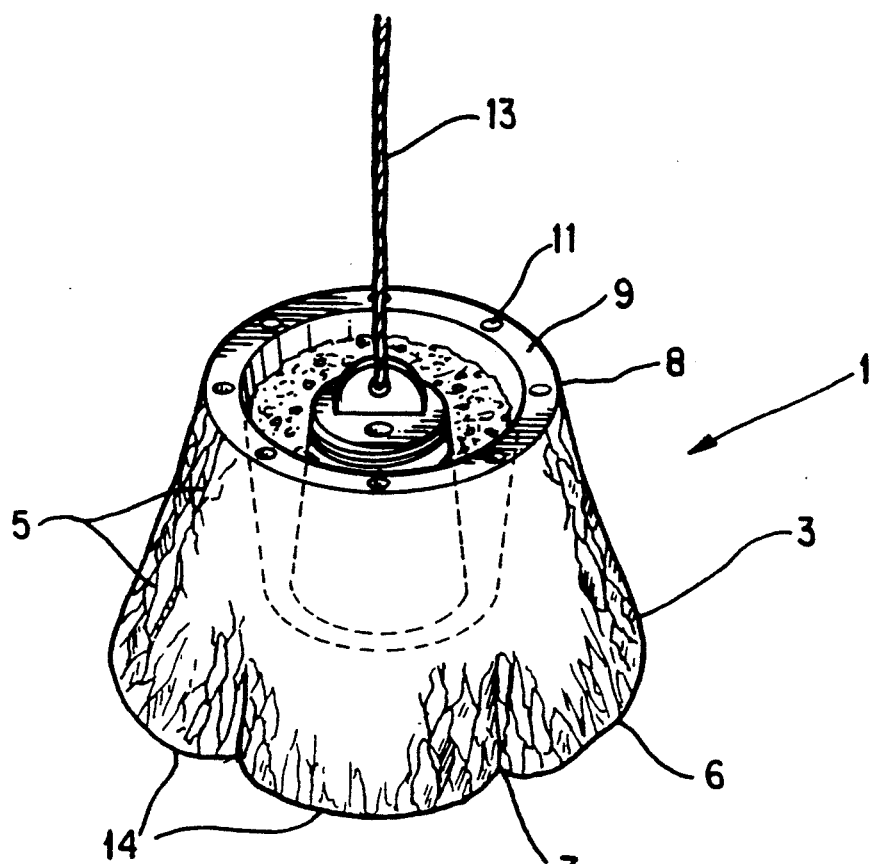
FIG. 1 is a perspective view of the fish attracting device in accordance with one embodiment of the present invention.

With reference to all the Figures, the fish attracting device 1 includes an outwardly flared outer wall 3, having a textured bark-like outer surface 5. The bottom end 6 of device 1 flares outwardly away from axis 4 and includes scallops 14 that from edge 7. The upper end 8 of device 1 is connected to downwardly depending, inner chamber 21 by annular member 9. Annular member 9 contains through-holes or openings 11 through which a fluid, e.g., water may pass. Annular member 9, shown as a planar annular wall, is connected to the inner slanted wall 23 of inner chamber 21.

Figure 3:
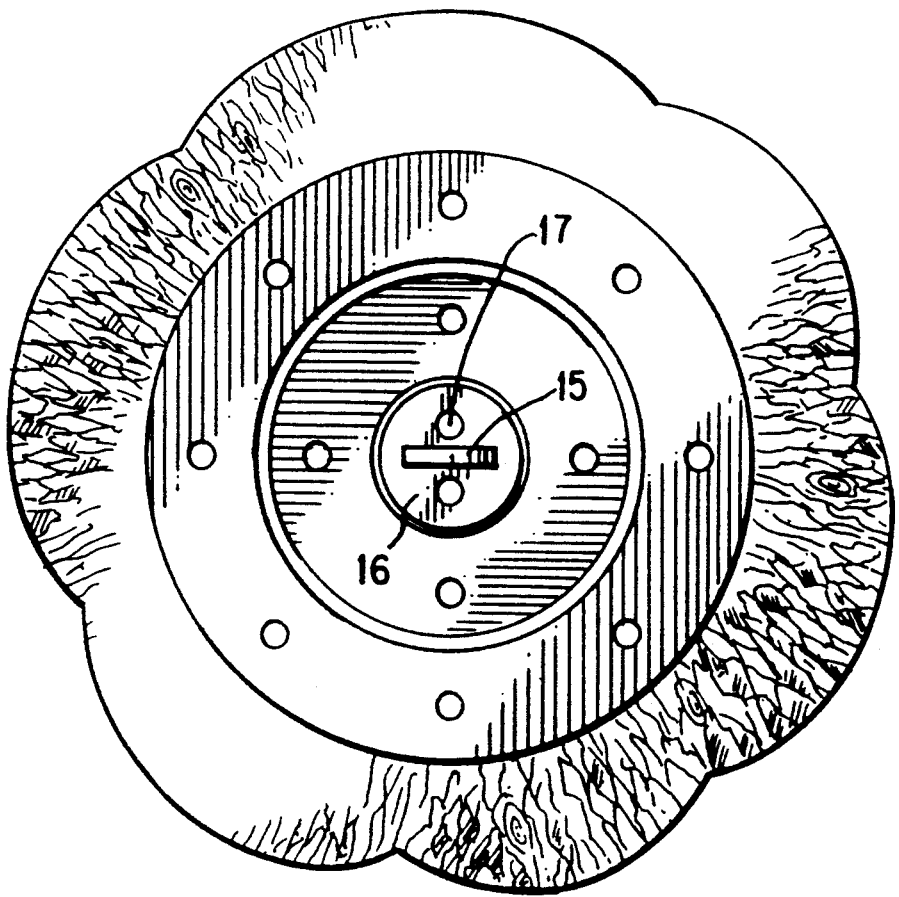
FIG. 3 is a top view of FIG. 2B.
Figure 4:
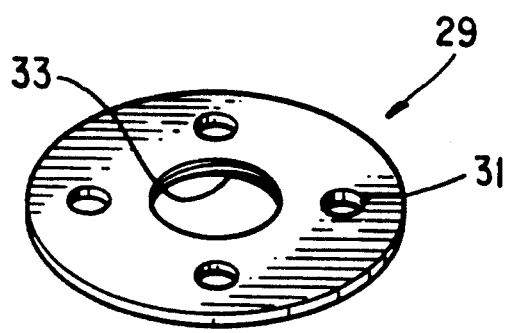
FIG. 4 is a perspective view of the gravel cover of FIGS. 2B and 3.

Inner chamber 21 includes tapered outer wall 23 that is tubular in shape and is slanted, or inclined, inwardly from top end 20 to bottom end 22 along axis 4. Inner chamber 21 also includes an upwardly extending central member 28. Member 28 has a wall 25 that tapers inwardly from the lower end 26 to the upper end 27 along axis 4. Member 28 is closed at the upper end 27 by top wall or cap 16. An annular wall 24 joins bottom end 22 of outer wall 23 to the lower end 26 of the tapered tubular wall 25. Cap 16 includes through-holes or openings 17 and a ring-like structure 15. (FIG. 3) Ring like structure 15 includes an opening 18 through which a rope 13 or similar device is placed to position the fish attracting device on the floor of the water bed.

Gravel 19, or similar weighting material, is located within chamber 21 that is located between inner tapered tubular wall 23 and tapered tubular wall 25.

Figure 2A:
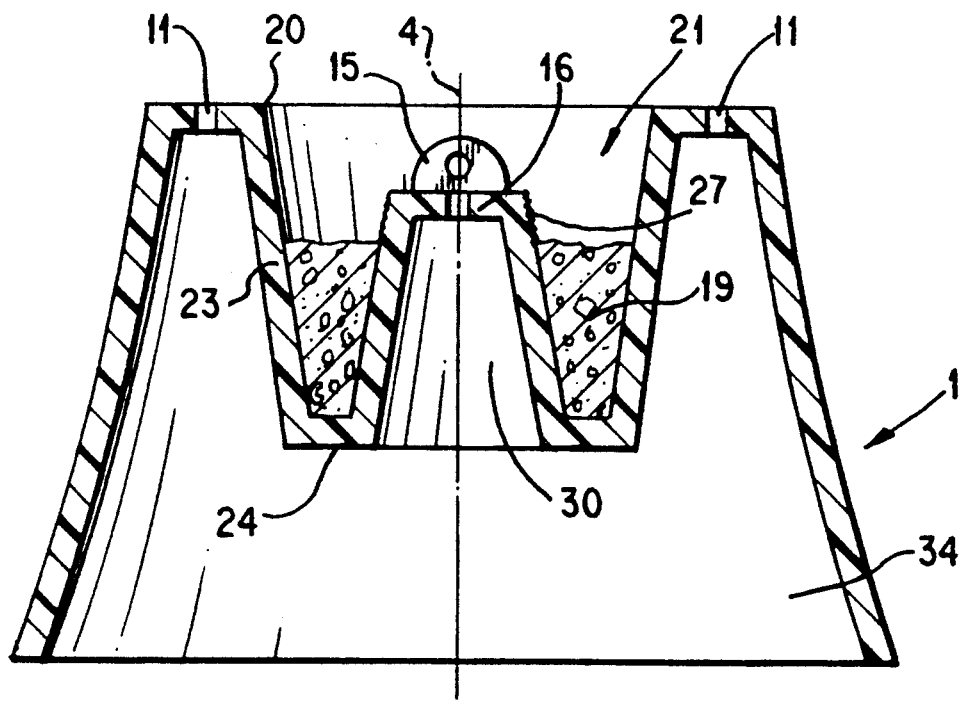
FIG. 2A is a cross-section view of FIG. 1.
Figure 2B:
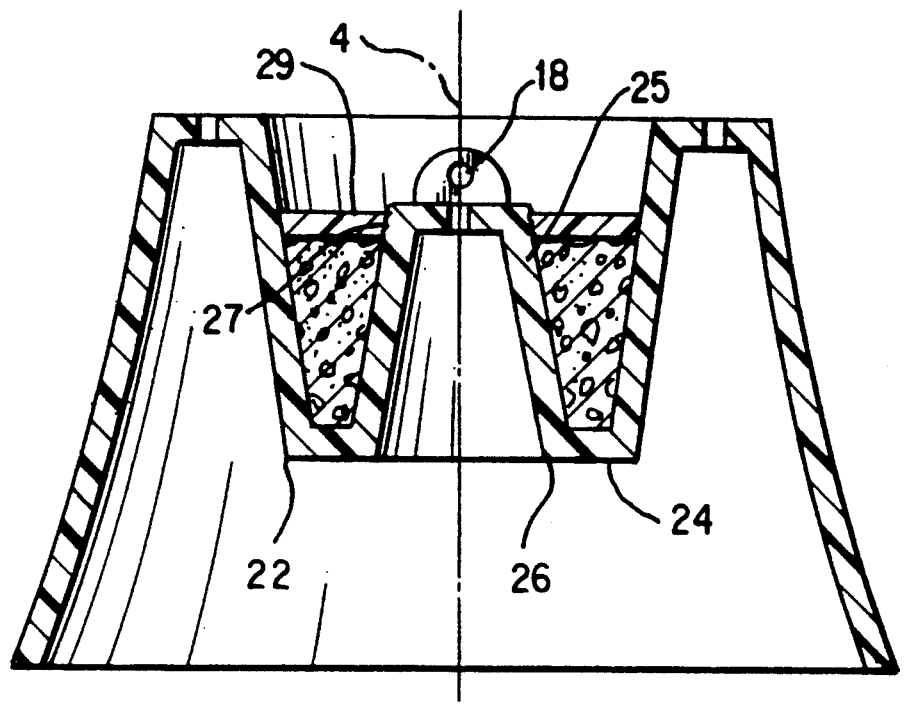
FIG. 2B is a cross-section view of FIG. 1 that also includes a gravel cover.

As more clearly shown in FIG. 2A, tubular wall member 25, is a hollow truncated chamber 30 and has external threads 27. External threads 27 cooperate with the internal threads 33 on cover 29. Cover 29 also includes air openings 31.

Walls 25 and 28 can also be curved in shape. The device is lightweight due to chambers 21, 30, and 34. The walls of the device are shaped and designed so that a plurality of fish attracting devices 1, according to the instant invention, may be stacked within one another in nesting relationship.

Figure 5:
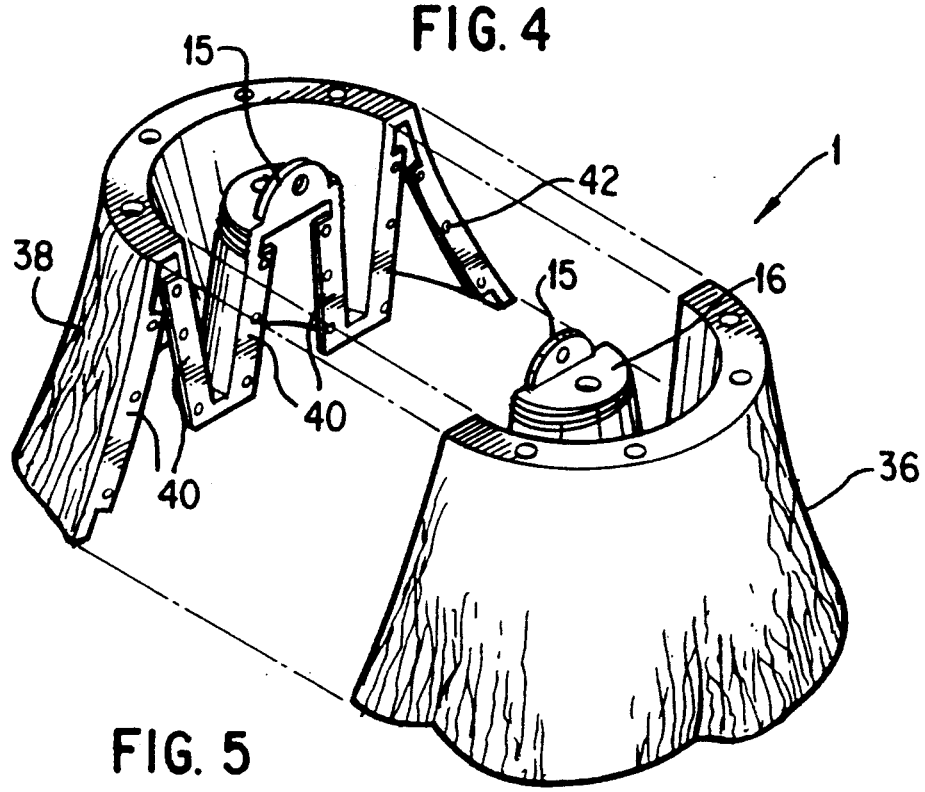
FIG. 5 an expanded view of the fish attracting device in accordance with a second embodiment of the present invention; and, FIG. 6 is an enlarged view of the connecting flanges of FIG. 6.
Figure 6:
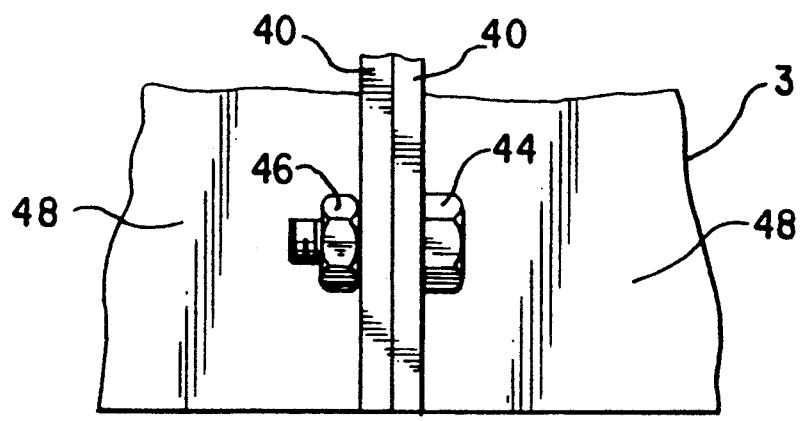

A second embodiment of the fish attracting device of the instant invention is shown in FIGS. 5 and 6. In FIG.

5, the fish attracting device 1 is formed from two similar sections 36 and 38. Sections 36 and 38 each include flanges or tabs 40. The flanges or tabs include openings 42 to received bolts 44. It is also possible to use a single flange instead of a plurality of flanges or tabs. Although ring 15 is shown as being split, it is within the scope of the instant invention to have the ring on only one side of top wall or cap 16. FIG. 6 shows flanges 40 on the inside wall surfaces 48 of sections 36 and 38. The flanges 40 are fastened together by bolts 44 and nuts 46.

The fish attracting device according to the instant invention can be used in the following exemplary manner. The first step is selecting an appropriate location in a stream or lake for the placement of the fish attracting device of the invention. After the selection is made, the fishing attracting device or devices are loaded into the boat and transported to the desired location. If the device 1 is fromed from multiple section, e.g., 36 and 38, it can be assembled at any time prior to placement in the water. The operator than places the weighting material 19 into chamber 21. Cover 29 is then fastened in place, if desired. Next a rope 13 is fed through opening 18 in ring 15 and the device lowered into the water. The weighting material 19 forces the device 1 to sink whereby water and any trapped air passes upwardly through holes 11 and 17 in device 1.

It should be understood, however, that the foregoing description of the invention is intended to be merely illustrative, thereof, and that other modifications and embodiments may be apparent to those skilled in the art without departing from the spirit of the invention.

We claim:

1. A fish attracting device comprising:
   an outer wall having a base that is substantially open ended,
   an annular wall connecting an upper end of said outer wall to an inner, downwardly extending chamber,
   said inner chamber having an upwardly extending member with an upper end, terminating below said upper end of said outer wall, said upper end of said member having at least one opening therein,
   said upwardly extending member also having means for detachable connection to a lowering device, and
   openings in at least one of said walls, at an upper end thereof for passing fluid therethrough.

2. The device according to claim 1, wherein said outer wall, said connecting wall, said inner chamber, and said upwardly extending member are shaped so that a plurality of fish attracting devices can be stacked in a nesting arrangement.

3. The device according to claim 1, including means for maintaining said device in a submerged state.

4. The device according to claim 3, wherein said means for maintaining said device in a submerged state comprises gravel located within said inner chamber.

5. The device according to claim 1, wherein said outer wall is trunk-shaped and flares downwardly and outwardly from a major longitudinal axis of said device and terminates in an outer, scalloped edge.

6. The device according to claim 5, wherein said trunk-shaped wall has an outer surface that is textured.

7. The device according to claim 1, wherein said device is formed from a plurality of sections that mate with one another.

8. The device according to claim 1, wherein said device is formed from two sections that are identical to one another and are adapted to be connected to each other.

9. The device according to claim 4, further including a cover cooperating with said inner chamber and said upwardly extending member to retain said gravel within said inner chamber.

10. The device according to 9, wherein said cover is an annular ring having internal threading, said upwardly extending member is cone-shaped, and the threads on said threaded annular ring cooperate with respective threads on an upper end of said upwardly extending member.

11. The device according to claim 2, wherein said outer wall is trunk-shaped, and is flared outwardly towards a bottom end and has a textured outer surface, said inner chamber includes an outer tapered tubular wall, and said upwardly extending member comprises a tapered tubular wall whereby said trunk-shaped wall, said annular wall, and said tapered tubular walls are arranged such that a plurality of fish attracting devices can be stacked in a nesting arrangement.

12. A device according to claim 1, wherein said openings for passing fluid through said fish attracting device are a plurality of through-holes.

13. A device according to claim 11, wherein the trunk-shaped outer wall, said outer wall of said inner chamber and said wall forming the cone-shaped upwardly extending are integrally formed to define a one piece unit.

14. A device according to claim 11, further including a second annular wall connecting a lower end of said outer tapered tubular wall of said inner chamber to said upwardly extending member, wherein said inner chamber contains weight means therein, said annular wall including a plurality of openings which cooperate to allow fluid to pass through the openings so that said weight means maintains the device submerged in a body of water.

15. A fish attracting device comprising:
   a textured, trunk-shaped outer wall flared outwardly at a lower end to terminate in a scalloped edge, said textured, trunk-shaped outer wall being connected at an upper end to a first annular wall with through-openings therein,
   an inner chamber having a tapered, tubular outer wall, an upwardly extending, centrally disposed cone-shaped member, and a second annular wall connecting a lower end of said tapered tubular outer wall to said cone-shaped member, wherein said inner chamber extends downwardly from said first annular wall,
   said cone-shaped member having an upper end, said upper end of said cone-shaped member having at least one opening therein and means for detachable connection to a lowering device,
   said plurality of openings in said first annular wall and said at least one opening in said upper end of said cone-shaped member cooperating to allow fluid to pass therethrough so that weight means associated therewith is capable of submerging the device in a body of water.

16. The device according to claim 15, further including gravel as the weight means.

17. The device according to claim 16, wherein a cover is provided to cooperate with said cone-shaped member to maintain the gravel in said downwardly extending chamber.

18. The device according to claim 15, wherein said upper end of said cone-shaped member terminates below said upper end of said trunk-shaped wall.

19. A device according to claim 15, wherein the trunk-shaped outer wall, said first annular wall, said outer wall of said inner chamber, said second annular wall and said wall forming the cone shaped central member are integrally formed to define a one piece unit.

20. A method of fishing comprising the steps of: selecting an appropriate location in a stream or lake for the placement of a fish attracting device, providing at least one fish attracting device according to claim 1, placing the fish attracting device in said selected location to establish a fish habitat, and fishing in said fish habitat that was created by the use of said fish attracting device.

21. The method according to claim 20, wherein a plurality of fish attracting devices as defined in claim 1, are placed in said selected location.

* * * * *